US006452547B1

(12) United States Patent
Johannessen

(10) Patent No.: US 6,452,547 B1
(45) Date of Patent: Sep. 17, 2002

(54) METHOD OF AND APPARATUS FOR EXPANDING THE DIGITAL BIT RATE POTENTIAL FOR COMMUNICATION ADDED TO LORAN-C RADIO NAVIGATION PULSE TRAINS AND THE LIKE, WITHOUT AFFECTING THE NAVIGATION CAPABILITY AND INTEGRITY THEREOF

(75) Inventor: Paul R. Johannessen, Lexington, MA (US)

(73) Assignee: Megapulse Inc., Billerica, MA (US)

( * ) Notice: Subject to any disclaimer, the term of this patent is extended or adjusted under 35 U.S.C. 154(b) by 0 days.

(21) Appl. No.: 09/833,022

(22) Filed: Apr. 11, 2001

(51) Int. Cl.[7] ................................................. G01S 1/24

(52) U.S. Cl. .................................................... 342/388

(58) Field of Search ................................. 342/388–391

(56) References Cited

PUBLICATIONS

Enhanced Loran–C Data Channel Project, Peterson et al., Presented at International Symposium on Integration of LORAN–C/EUROFIX and EGNOS/GALILEO in Bonn, Germany, Mar. 22–23, 2000. http://www.cga.edu/cas/2000/00_03paper.pdf.*

* cited by examiner

*Primary Examiner*—Thomas H. Tarcza
*Assistant Examiner*—Fred H Mull
(74) *Attorney, Agent, or Firm*—Rines and Rines

(57) ABSTRACT

A method and apparatus for increasing the potential digital bit data rate potential for communication-to-be-added to Loran-C radio-frequency pulse navigation transmitters and the like without affecting the navigation capability and integrity of the system, involving frequency-sweeping the pulse carrier frequency between critical lower and upper limits with respect to the pulse carrier frequency during the parts of each pulse following the initial part used for navigation timing.

24 Claims, 5 Drawing Sheets

IFM — Frequency and Phase Shift (97.5 kHz from 60 to 160 μsec: 102.5 kHz from 160 to 500 μsec)

(97.5 kHz from 60 to 160 μsec: 102.5 kHz from 160 to 500 μsec)

Simulated Signal Spectrum (102.5 kHz from 60 to 160 μsec: 97.5 kHz from 160 to 500 μsec)

(102.5 kHz from 60 to 160 μsec: 97.5 kHz from 160 to 500 μsec)

Simulated Signal Spectrum

METHOD OF AND APPARATUS FOR EXPANDING THE DIGITAL BIT RATE POTENTIAL FOR COMMUNICATION ADDED TO LORAN-C RADIO NAVIGATION PULSE TRAINS AND THE LIKE, WITHOUT AFFECTING THE NAVIGATION CAPABILITY AND INTEGRITY THEREOF

BACKGROUND

Loran-C and other radio-wave pulse train navigation systems have been designed to serve also to transmit and receive digital communication messages generally by pulse-position modulation (PPM) involving appropriate encoding of communication messages and logical multiplication and inversion of encoded signals prior to phase modulation of the Loran-C pulses, as described, for example, in U.S. Pat. Nos. 4,800,391 and 4,821,038 of Megapulse, Inc., the common assignee of the present application. With Loran-C 100 K Hz carrier frequency systems, such modulation enables a digital bit rate of 70 bps.

A current example of such PPM is the Eurofix System wherein a seven-bit word is created using the last six pulses of an eight-pulse group. To enhance the Loran data bit rate capability, schemes such as increasing the number of pulses from 300 pps to 500 pps (sometimes referred to as Super-numerary Loran) and using a three-level Intrapulse Frequency Modulation (IFM) on such system pulses are being discussed.

It would, however, be highly desirable, particularly with existing Loran-C transmitter stations worldwide, if the bit rate could indeed somehow be increased to 250 bps and higher with the current station equipment, and still without affecting the integrity of the navigation capability of the Loran-C system.

The present invention provides such a break-through: the discovery of a novel modulation scheme readily implementable in current (and future) Loran-C (and similar) transmitters, wherein a novel type of frequency modulation is added on the Loran-C transmitted pulses.

OBJECTS OF INVENTION

The primary object of the invention, accordingly, is to provide a new and improved method of and apparatus for expanding the digital bit-rate potential for message communication to be supplementarily carried on Loran-C radio navigation transmissions and the like, without, however, affecting the principal radio navigation capabilities thereof.

A further object is to accomplish such an end with electronic circuitry that lends itself to ready modification of the current worldwide Loran-C (and similar) transmitter equipments.

Other and further objects will be explained hereinafter and are delineated, also, in the appended claims.

SUMMARY

In summary, from one of its important viewpoints, the invention embraces a method of expanding the digital bit rate potential for communication to be added to Loran-C and similar radio-frequency navigation system transmitter pulse trains and without affecting the navigation capability and integrity of the system, that comprises, generating such radio-frequency pulses centered on a predetermined carrier frequency and transmitting the same from antennas to enable users to receive and use the initial part of each transmitted pulse for navigation timing and location; during the remaining parts of each transmitted pulse, sweeping the generated carrier frequency thereof in opposite directions, first below or above, and then above or below the carrier frequency during successive further parts of each pulse, but within a predetermined band between predetermined lower and upper frequency limits on opposite sides of said carrier frequency; further, during said sweeping, maintaining the pulse energies below the lower frequency limit and above the upper frequency limit substantially equal for each pulse; and using the frequency modulation effected by said sweeping to provide communication bits.

Preferred and best mode implementations and designs for practicing the invention are hereinafter explained in detail.

DRAWINGS

The invention will now be described in connection with the accompanying drawings, FIG. 1 of which is a simplified circuit diagram of a current solid-state Loran-C transmitter (SSX), as of the type marketed by said Megapulse, Inc. under the nomenclature AN/FPN/64;

DESCRIPTION OF THE PREFERRED EMBODIMENT(S) OF THE INVENTION

Figure 1:
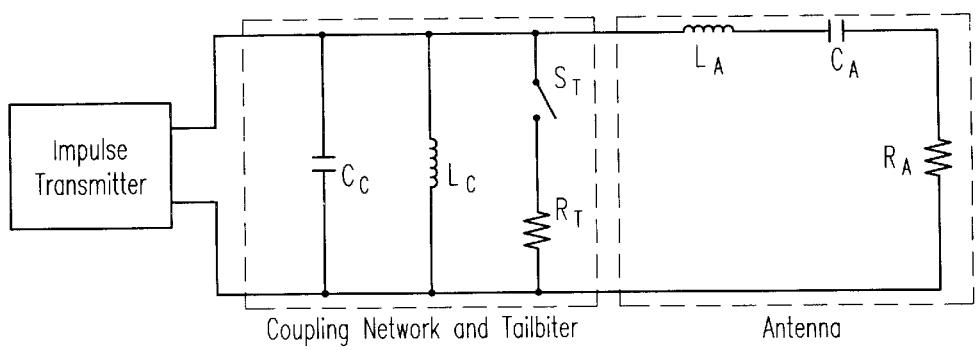
Figure 2:
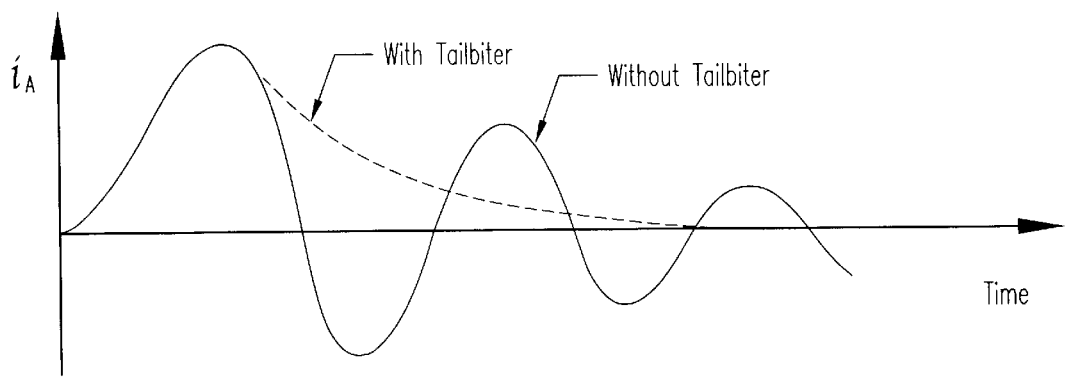
FIG. 2 is a waveform diagram illustrating the envelope of the antenna current in the transmitter of FIG. 1, with and without the use of a "tailbiter" circuit.
Figure 3:
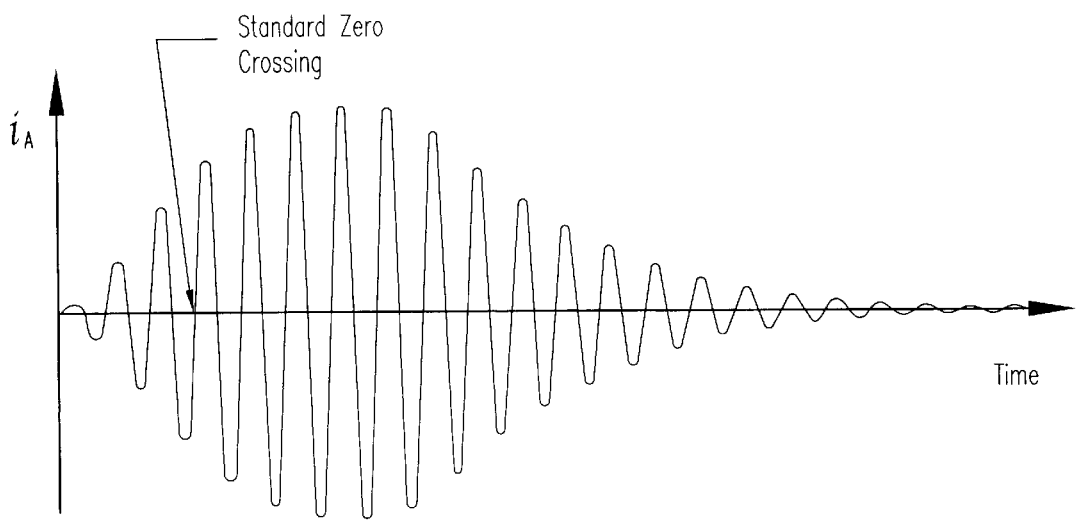
FIG. 3 is a waveform diagram of the actual antenna current produced by the circuit of FIG. 1 with "tailbiter"
Figure 4A:
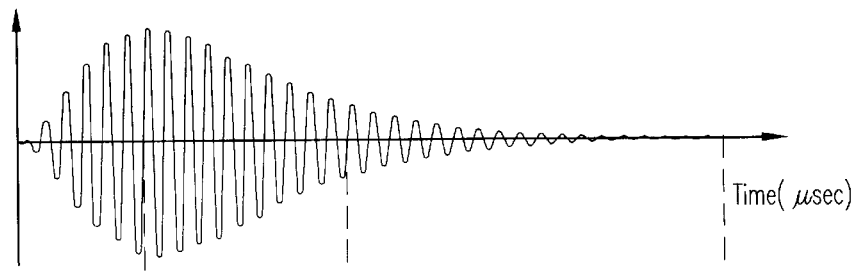
FIG. 4A illustrates the antenna current Loran C pulse waveform of FIG. 3 in timed relationship with the novel frequency modulation (FIG. 4B) and concurrent phase modulation (FIG. 4C) underlying the novel scheme of the present invention.

Referring first to current-day radio pulse train solid state transmitters for purposes of contrasting with the present invention, and illustrating the invention as applied to the preferred Loran-C application, FIG. 1 is a simplified schematic circuit diagram of a typical solid state Loran-C transmitter (SSX) generating Loran-C pulses, FIG. 3, by impulse-charging a parallel tuned circuit $C_c$–$L_c$ in a Coupling Network, so-labeled, and connected to the transmitting Antenna represented by its series inductance $L_A$ and capacitance $C_A$, and parallel load resistance R. Both the Coupling Network and the Antenna are normally tuned to the before-mentioned 100 K Hz basic Loran-C carrier frequency. The Impulse Transmitter charges the Coupling Network which, in turn, transfers energy to the Antenna with the resulting antenna current waveform envelope shown in FIG. 2. To avoid the oscillating tail of the resulting pulse, shown to the right in the waveform in the solid-line curve labeled "Without Tailbiter", a "tailbiter" circuit consisting of a solid-state switch $S_T$ in series with a resistor $R_T$ is shown in FIG. 1, connected in parallel with the Coupling Network. Closing the switch $S_T$ when the coupling network voltage is zero, produces the desired exponentially decaying antenna current the pulse shown by the dotted line, the "With Tailbiter" of FIG. 2, the generating the Loran-C radio-frequency (rf) current pulse of FIGS. 3 and 4A, all as described in said patents and the references cited therein.

As is further well-known, the Loran-C navigation system uses the first three cycles of the rf pulse to determine the time-of-arrival for position-fixing. Adding communication modulation, as explained in said patents, accordingly, must not disturb these cycles in phase or in frequency. Phase of frequency modulation can start, however, at 30 $\mu$sec. or later into the pulse. By changing the normally tuned 100 kHz resonant frequency of the Antenna, the radio frequency of the antenna current will correspondingly change. In the Loran-C navigation system, however, the specifications require that the spectrum of the Loran-C rf pulse stay within the predetermined frequency band of about 90 to 110 kHz, and further that the energy both below 90 kHz and above 110 kHz limits be less than 0.5% of the total pulse energy.

Figure 4B:
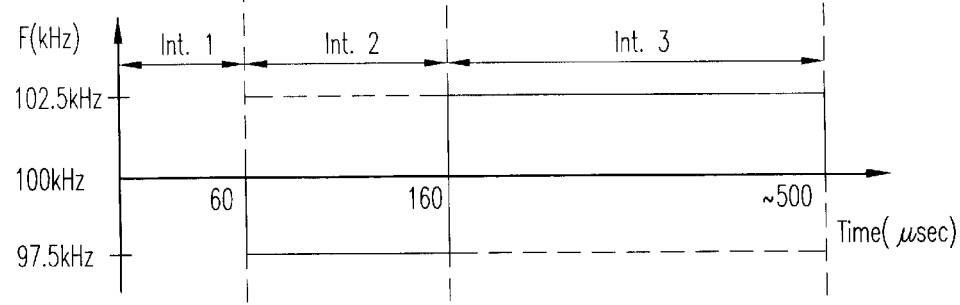
Figure 4C:
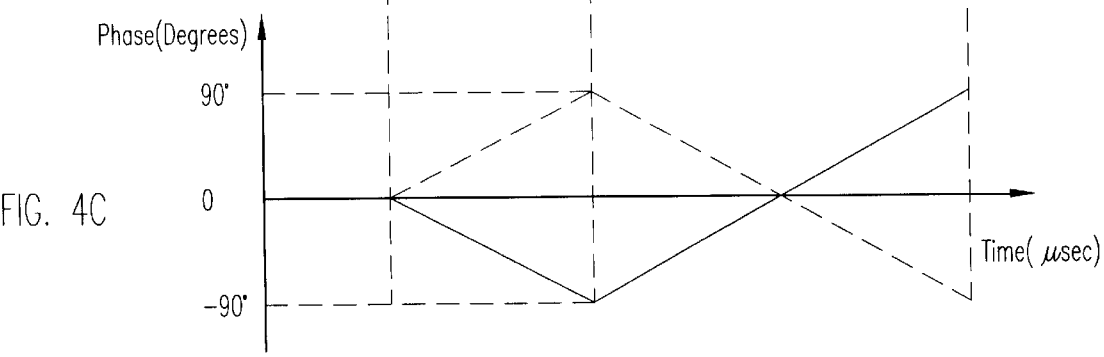

Frequency modulation of ±2.5 kHz, as shown in FIG. 4B, generates a phase shift at time 160 $\mu$sec into the pulse of +90° or −90°, as shown in FIG. 4C.

Figure 5:
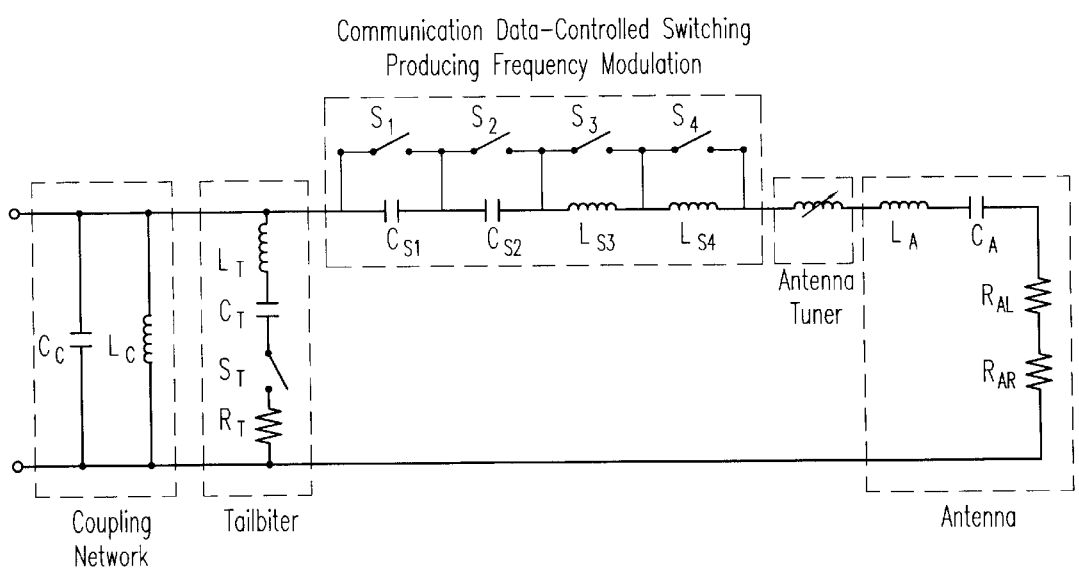
FIG. 5 is a schematic circuit diagram of the preferred transmitter circuit implementation of the invention for attaining the operation represented in FIGS. 4B and 4C.

To accomplish this modulation, the invention uses fast, highly efficient solid-state switches $S_1$–$S_4$ shown in the schematic diagram of FIG. 5. These switches are connected across capacitor $C_{S1}$, $C_{S2}$ and inductors $L_{S3}$ and $L_{S4}$—all in series with the Antenna. As earlier described in connection with FIG. 4, the pulse is divided into three intervals. In Interval 1, the pulse frequency is 100 kHz. In Interval 2, pulse frequency is either 97.5 kHz or 102.5 kHz. In Interval 3 pulse frequency is either 102.5 kHz or 97.5 kHz. Just before the end of Interval 3 pulse frequency is again 100 kHz. The pulse has three states which are designated as the Zero State, the Plus State, and the Minus State. In the Zero State all switches are open except the Tailbiter Switch, $S_T$, that closes at time 70 $\mu$sec into the pulse and opens before the start of the following pulse. In the Plus State, the switch positions are:

| | | $\Delta f$ 0 |
|---|---|---|
| Interval 1 | All switches open | |
| Interval 2 | $S_T$ and $S_3$ closed. The closing of $S_3$ decreases the series inductance which, in turn, increases pulse frequency. The closing of the Tailbiter Switch, $S_T$, shapes the tail as shown in FIG. 2. | +2.5 kHz |
| Interval 3 | $S_T$, $S_1$, $S_2$, and $S_3$ closed. The closing of $S_1$ and $S_2$ increases the antenna capacitance thus decreasing the Antenna frequency. | −2.5 kHz |

In the Minus State, the switch positions are:

| | | $\Delta f$ 0 |
|---|---|---|
| Interval 1 | All switches open | |
| Interval 2 | $S_T$ and $S_2$ closed | −2.5 kHz |
| Interval 3 | $S_T$, $S_2$, $S_3$ and $S_4$ closed | +2.5 kHz |

At high power levels it is easy to close a solid state switch but it is difficult to open the switch. In the switching scheme described, all the switch closings take place at high power levels while switch openings take place at low power levels, i.e. end of the pulse tail.

Figure 6:
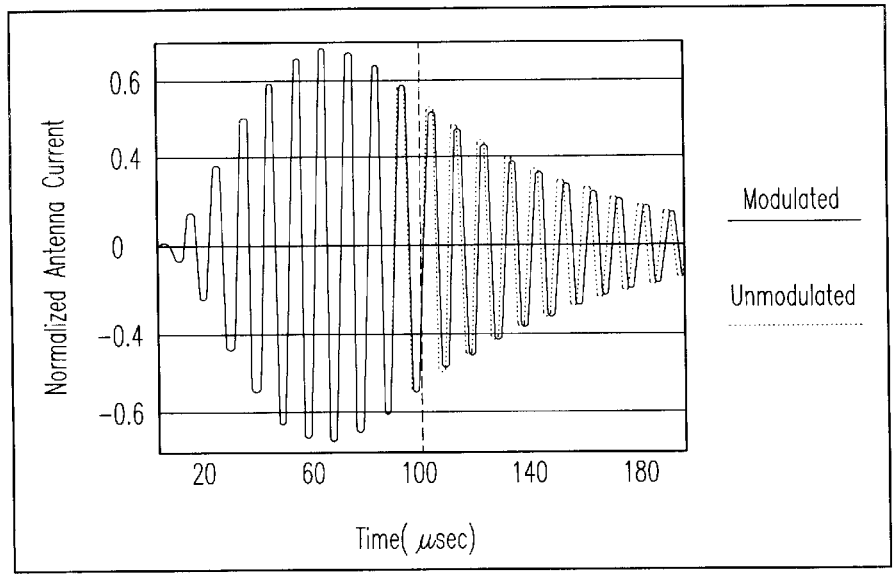
FIG. 6 is a composite waveform of an unmodulated and a frequency modulated Loran-C pulse which results in a phase modulation of −90°.
Figure 7:
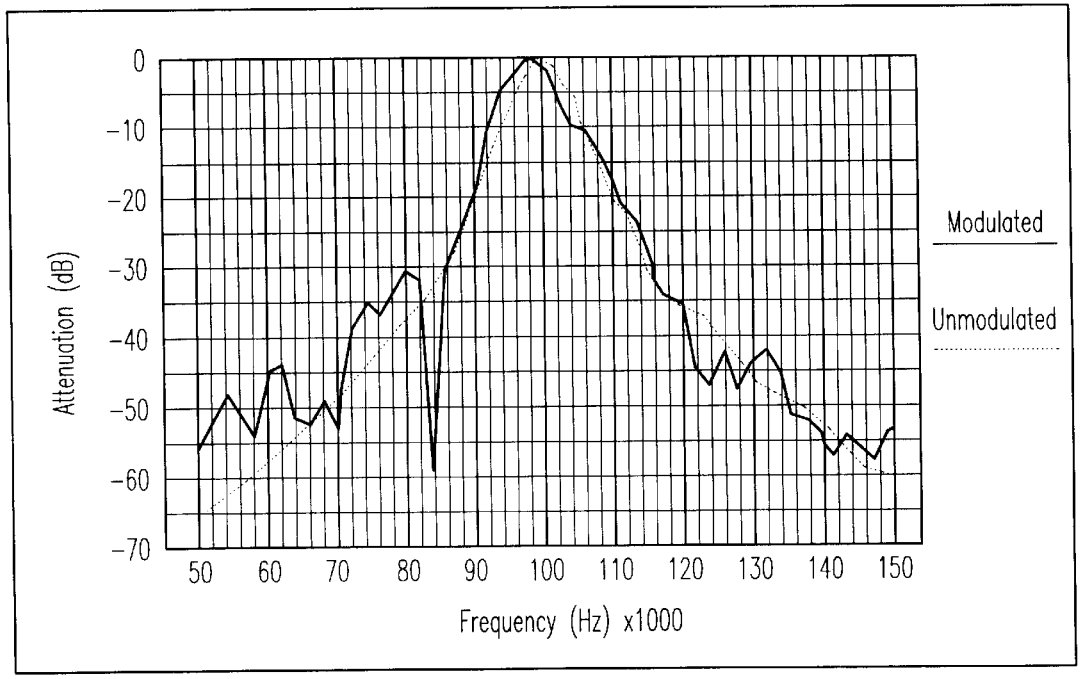
FIG. 7 is a composite spectrum of the waveforms shown in FIG. 6—the solid line is the modulated spectrum, the dotted line is the unmodulated spectrum.
Figure 8:
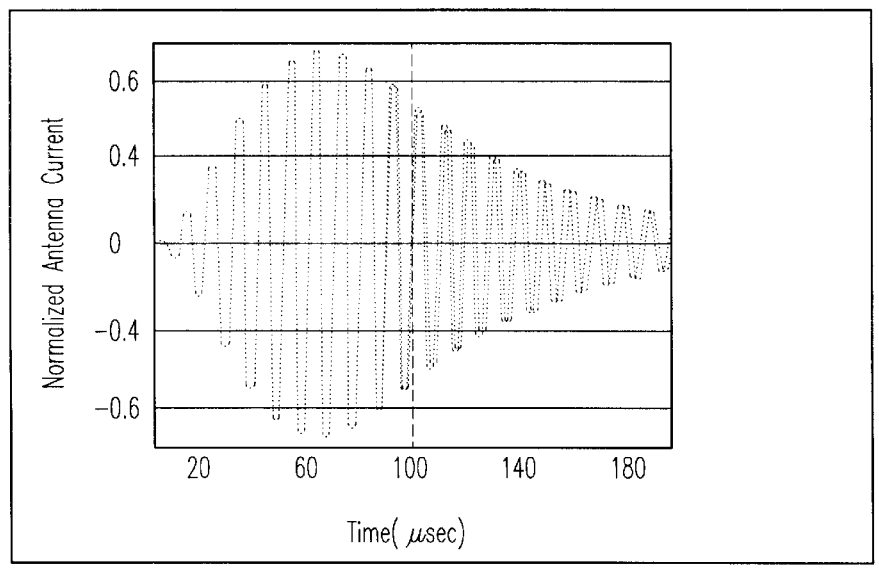
FIG. 8 is a composite waveform of an unmodulated and a frequency modulated Loran-C pulse which results in a phase modulation of +90°.
Figure 9:
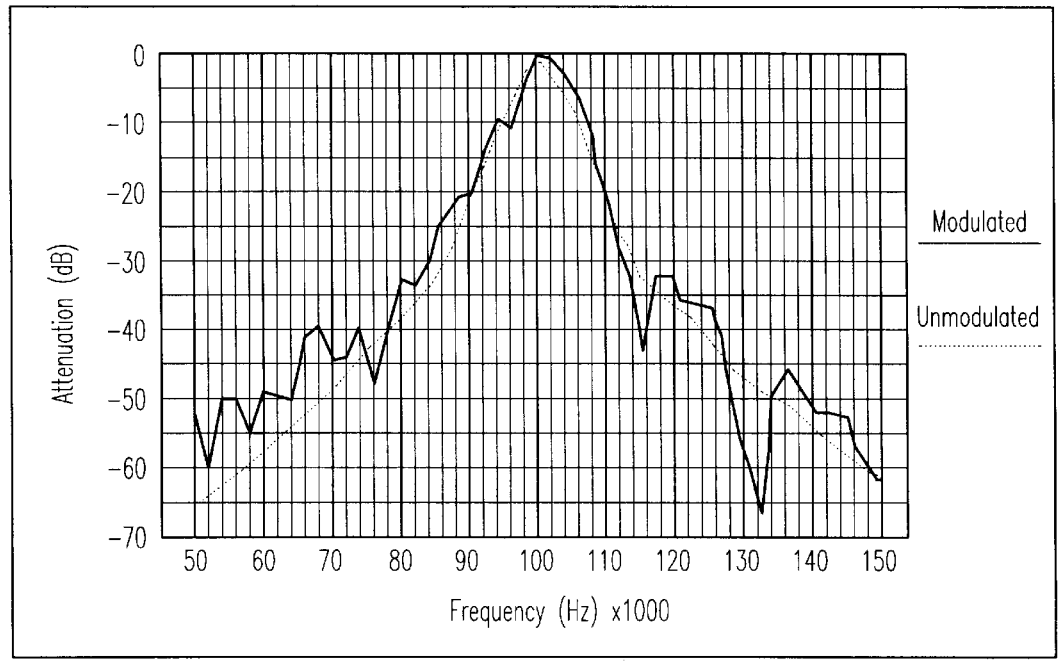
FIG. 9 is a composite spectrum of the waveforms of FIG. 8.

The effects on the pulse waveform and spectrum of the frequency modulation of FIG. 4 are shown in FIGS. 6–9. The effects of a positive phase shift of 90° are shown in FIGS. 6 and 7. The solid line in FIG. 7 is the spectrum of the modulated pulse while the dotted line is that of an unmodulated pulse. As can be seen from FIG. 7 this has slightly increased for the modulated pulse-thus meeting the spectrum requirement of 1% out-of-band intact. The effects of a negative phase shift of 90° are shown in FIGS. 8 and 9. Again the spectrum meets the out-of-band requirement.

The invention thus, in, for example, introducing and removing inductance between the transmitter output and the antenna to shift the frequency from 100 kHz toward 97.5 kHz, and then sweeping toward 102.5 kHz and then back to 100 kHz, all within the critical restrictions earlier discussed, maintains the center of the frequency spectrum for each pulse close to 100 kHz, and equalizes the energies below and above 100 kHz. This frequency modulation can serve as communication bits as explained in said patents.

Through this technique of the invention, thus, it is now possible substantially to increase the digital data bit rate communication modulation potential of Loran-C pulse navigation transmitters of current and future form, (and of other pulse train communication systems and the like), without in any way affecting the integrity of the navigation capability and integrity thereof. This modulation scheme, as earlier mentioned, has been found to permit a bit rate of over 250 bps on the Loran-C signal without affecting the navigation capability of the Loran-C navigation operation.

Further modifications will also occur to those skilled in this art, including different values of frequency shifting within the above-defined requirements and specifications (though for Loran-C operation, of the order of about the illustrative frequency values presented); and, as earlier pointed out, the approach of the invention may also be useful with other types of navigation and pulse train communication systems such being considered to fall within the spirit and scope of the invention as defined in the appended claims.

What is claimed is:

1. A method of expanding the digital bit rate potential for communication to be added to Loran-C and similar radio-frequency navigation system transmitter pulse trains and without affecting the navigation capability and integrity of the system, that comprises, generating such radio-frequency pulses centered on a predetermined carrier frequency, coupling the pulses to an antenna, and transmitting the same from the antenna to enable users to receive and use the initial part of each transmitted pulse for navigation timing and location; during the remaining parts of each transmitted pulse, switching impedance elements into and out of the coupling for effecting sweeping the generated carrier frequency thereof in opposite directions, first below or above, and then above or below the carrier frequency during successive further parts of each pulse, but within a predetermine band between predetermined lower and upper frequency limits on opposite sides of said carrier frequency; further, during said sweeping maintaining the pulse energies below the lower frequency limit and above the upper frequency limit substantially equal for each pulse while maintaining the center of the frequency spectrum for each pulse close to said carrier frequency; and using the frequency modulation effected by said sweeping to provide communication bits.

2. The method of claim 1 wherein the impedance element switching during each pulse is effected by one or both of high speed switching of inductance and capacitance into and out of series connection in a location of the coupling between the transmitter pulse generator and the antenna, correspondingly to increase or decrease the frequency.

3. The method of claim 1 wherein said lower frequency is generated at 100 kHz, said predetermined band is established at 97.5 to 102.5 kHz, and the energy both below 90 kHz and above 110 kHz is controlled to less than 0.5% of the total pulse energy.

4. The method of claim 1 wherein the frequency of each pulse is returned to said carrier frequency at the end of each pulse.

5. The method of claim 1 wherein said further parts of each pulse are made of different time durations to achieve a balanced spectrum.

6. The method of claim 5 wherein the time duration of the first of the further parts is made shorter than the duration of the second of the further parts in order to compensate for the pulse amplitude differences thereof.

7. The method of claim 6 wherein the pulse time interval for said initial part of the pulse is 60 μsec, the time interval for said first part of the further parts is about 60–160 μseconds, and the interval for the second part of the further parts is abut 160–500 μseconds.

8. The method of claim 7 wherein the pulse frequency in said first part of the further parts is either about 97.5 or 102.5 kHz, and the frequency in the said second part is either about 97.5 or 102.5 kHz.

9. Apparatus for expanding the digital bit rate potential for communication to be added to Loran-C and similar radio-frequency navigation system transmitter pulse trains and without affecting the navigation capability and integrity of the system, having, in combination, radio-frequency pulse generating transmitter means for generating radio-frequency pulses centered on a predetermined carrier frequency; antenna means coupled by a coupling network to the transmitter means for transmitting the radio-frequency pulses to enable users to receive and use the initial part of each transmitted pulse for navigation timing and location; the coupling network including impedance elements switchable into and out of the network for effecting frequency modulation during the remaining parts of each transmitted pulse, for sweeping the generated carrier frequency thereof in opposite directions, first below or above, and then above or below the carrier frequency during successive further parts of each pulse, but further a predetermined band between predetermined lower and upper frequency limits on opposite sides of said carrier frequency; means operable during said sweeping, for maintaining the pulse energies below the lower frequency limit and above the upper frequency limit substantially equal for each pulse while maintaining the center of the frequency spectrum for each pulse close to said carrier frequency; and means for using the frequency modulation effected by said sweeping to provide communication bits.

10. The apparatus of claim 9 wherein the impedance element switching for sweeping the frequency during each pulse is provided by one or both of inductance and capacitance elements in the coupling network between the transmitter pulse generating means and the antenna, each element provided with a high-speed switch for enabling connection into and out of the coupling network correspondingly to increase or decrease the frequency.

11. The apparatus of claim 9 wherein said carrier frequency is generated at 100 kHz, said predetermined band is established at 90 to 110 kHz, and the energy both below 90 kHz and above 110 kHz is controlled to less than 0.5% of the total pulse energy.

12. The apparatus of claim 9 wherein the frequency modulation means returns the frequency of each pulse to said carrier frequency at the end of each pulse.

13. The apparatus of claim 9 wherein timing means is provided to make the further parts of each pulse of different time duration to achieve a balanced spectrum.

14. The apparatus of claim 13 wherein the timing means makes the time duration of the first of the further parts shorter than the duration of the second of the further parts in order to compensate for the pulse amplitude differences thereof.

15. The apparatus of claim 14 wherein the pulse time interval for said initial part for the pulse is adjusted to 60 μseconds, the time interval for said first part of the further parts to about 60–160 μseconds, and the interval for the second part of the further parts to about 160–500 μseconds.

16. The apparatus of claim 15 wherein the pulse frequency is said first part of the further parts is swept either to about 97.5 or 102.5 kHz, and the frequency in said second part is swept either to about 97.5 or 102.5 kHz.

17. The apparatus of claim 9 wherein the frequency modulation means comprises a combination of supplemental capacitors and inductances switchable into and out of the circuit between the transmitter pulse generating means and the antenna in accordance with desired communication bit data.

18. The apparatus of claim 17 wherein a plurality of capacitors and inductances are connected in series between the transmitter generating means and the antenna, each shunted by a high-speed solid state switch.

19. The apparatus of claim 18 wherein the transmitter means is connected to the antenna means through a coupling network, that includes a series-connected switching network comprising series-connected capacitors and inductors each shunted by a high-speed solid state-state switch, and a shunt-connectable tailbiter network comprising capacitance and inductance and switchable by a further high-speed solid-state switch into and out of shunt-connection with said transmitter means.

20. The apparatus of claim 19 wherein the switching of the high-speed switches produces the sweeping frequency modulation during each pulse.

21. The apparatus of claim 19 wherein said initial part of each Loran-C transmitted pulse used for navigation timing is a first time interval during which the pulse frequency is adjusted at 100 kHz, and said remaining parts are divided into a second time interval during which the pulse frequency is changed Δf to be either about 97.5 kHz or 102.5 kHz, and a third time interval during which the pulse frequency is changed either about 102.5 kHz or 97.5 kHz, respectively, and wherein, just before the end of the third time interval, the pulse frequency is returned to said 100 kHz again.

22. The apparatus of claim 21 wherein there is provided in the coupling network two series-connected capacitors each shunted by a high speed solid state switch $S_1$ and $S_2$ and two series-connected inductors each shunted by a high speed solid switch $S_3$ and $S_4$, respectively, and the said further high speed solid switch $S_T$ connects said tailbiter network in shunt with and out of circuit with said transmitter means.

23. The apparatus of claim 22 wherein said pulse has three operational states of switching, a zero state, a plus state and a minus state as follows:

Zero State—all said switches open except $S_T$

Plus State
  First time interval—all switches open
  Second time interval—$S_T$ and $S_3$ closed
  Third time interval—$S_T$, $S_1$, $S_2$, $S_3$ closed Minus State
  First time interval—all switches open
  Second time interval—$S_T$ and $S_2$ closed
  Third time interval—$S_T$, $S_2$, $S_3$, and $S_4$ closed.

24. The apparatus of claim 23 wherein said $\Delta f$ at the respective states is adjusted substantially as follows:

Plus State
  Second time interval—$\Delta f = +2.5$ kHz
  Third time interval—$\Delta f = -2.5$ kHz Minus State
  Second time interval—$\Delta f = -2.5$ kHz
  Third time interval—$\Delta f = +2.5$ kHz.

* * * * *